United States Patent [19]
Uchino et al.

[11] Patent Number: 5,095,472
[45] Date of Patent: Mar. 10, 1992

[54] FOCUSING ERROR DETECTING SYSTEM FOR OPTICAL HEAD

[75] Inventors: Akihiro Uchino, Hitachi; Seigo Naitoh, Kohriyama; Hirobumi Ouchi, Hino; Shigeru Nakamura, Tachikawa, all of

[73] Assignees: Hitachi Cable Limited; Hitachi, Ltd., both of Tokyo, Japan

[21] Appl. No.: 531,962

[22] Filed: Jun. 1, 1990.

[30] Foreign Application Priority Data

Jun. 2, 1989 [JP] Japan .................................. 1-140835

[51] Int. Cl.$^5$ .............................................. G11B 7/00
[52] U.S. Cl. .............................. 369/44.14; 369/44.37
[58] Field of Search ............... 369/44.38, 44.14, 44.12, 369/44.41, 44.42, 112, 44.37; 250/201.5

[56] References Cited

U.S. PATENT DOCUMENTS 4,626,679 12/1986 Kuwayama et al. ............. 369/44.12
4,771,415 9/1988 Taki .................................. 369/44.14

Primary Examiner—Donald McElheny, Jr.
Attorney, Agent, or Firm—Dykema Gossett

[57] ABSTRACT

In a focusing error detecting method for an optical head wherein a laser beam from a laser light source is applied to a magneto-optical recording medium to form an image as a light spot thereon, and a focusing error is detecting according to a reflected light from the magneto-optical recording medium, the focusing error detecting method includes a step of dividing the reflected light from the magneto-optical recording medium into a 0-th order light, a +1-st order light and a −1-st order light by a diffraction grating, a step of applying the +1-st order light and the −1-st order light to a first detector and a second detector, respectively, the first and second detectors being arranged before and behind a beam emitting position of the laser light source, respectively and a step of computing outputs from the first and second detectors to obtain a focusing error signal. It is preferably that the laser light source is a semiconductor laser, and that the first and second detectors are mounted on a chip of the semiconductor laser to form a hybrid construction, thereby making the optical head more compact.

7 Claims, 7 Drawing Sheets

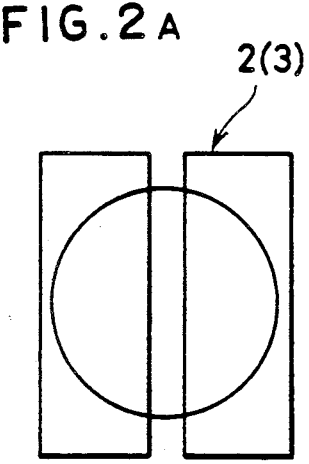
FIG.2A
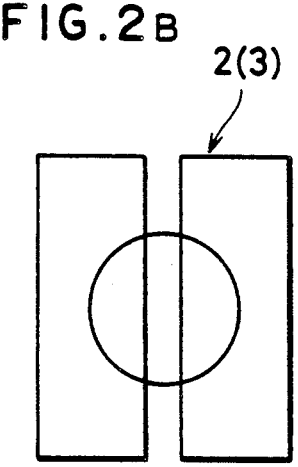
FIG.2B
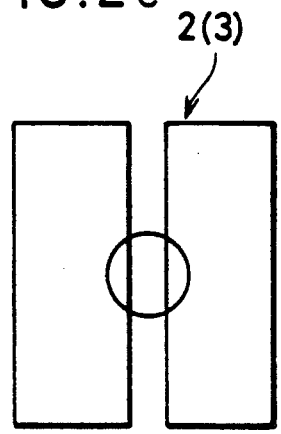
FIG.2C
FIG.3
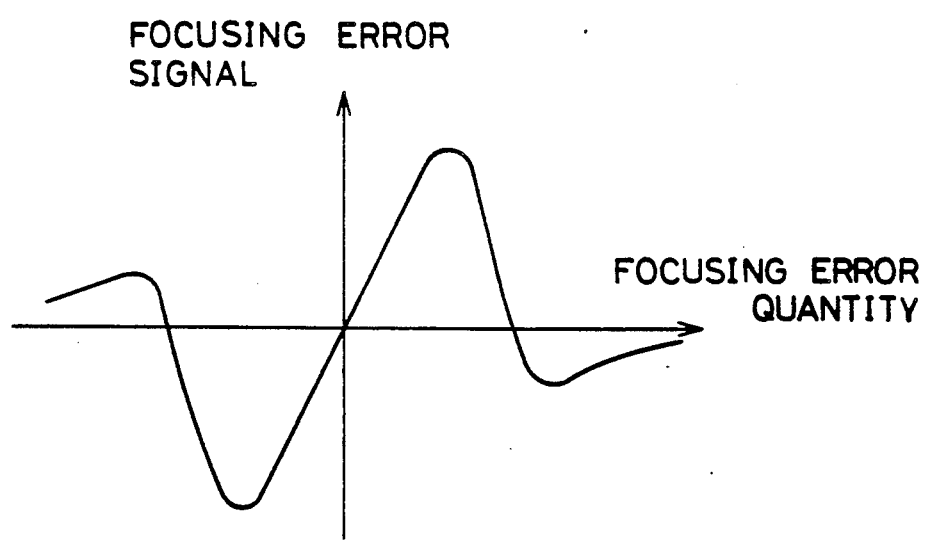

FOCUSING ERROR DETECTING SYSTEM FOR OPTICAL HEAD

BACKGROUND OF THE INVENTION

1. Technical Field

The present invention relates to an optical head for a magneto-optical recording medium such as a photomagnetic disk, and more particularly to a focusing error detecting system for the optical head.

2. Background Art

In one known optical head, light reflected from a magneto-optical disk (hereinafter referred to as an optical disk) is separated by using a beam splitter, and an information signal and a servo signal (AF signal, TR signal) are detected according to the separated light beams from the beam splitter.

For example, FIG. 11 of the accompanying drawings shows the construction of an optical head disclosed in Japanese Patent Publication No. 62-252552. In FIG. 11, a reflected light from an optical disk 60 is reflected by a first beam splitter 61, and is then applied through a cylindrical lens 62 using an astigmatic system to a detector 63, thus providing a focusing error signal from the detector 63. A tracking signal is also obtained from the detector 63. On the other hand, the reflected light from the optical disk 60 is also reflected by a second beam splitter 64, and is then separated into two light beams by a third beam splitter 65. The separated light beams are received by respective dedicated detectors 66 and 67 to read pre-formatted data and provide an information signal according to the sum and the difference between detection signals from the detectors 66 and 67.

Another type of optical head using an optical fiber is disclosed in Japanese Patent Publication No. 59-56239 for example. In this prior optical head, a reflected light from an optical disk is separated by using a first beam splitter, and a separated beam from the first beam splitter is further separated into a transmitted light beam and a reflected light beam by a second beam splitter. These light beams from the second beam splitter enter respective optical fibers, and are then emitted from the other ends of the optical fibers to respective detectors.

More specifically, as shown in FIG. 12, reflected light from an optical disk is reflected by a first beam splitter 71, and is then converged by a converging lens 72. The converged light is separated into a transmitted light beam and a reflected light beam by a second beam splitter 73. These light beams are individually applied to a first optical fiber 74 and a second optical fiber 75. The second beam splitter 73 has different sizes in its transmitting direction and reflecting direction. Further, the first optical fiber 74 and the second optical fiber 75 have respective inlet ends disposed before and behind a focal point of the converging lens 72. The light beams emitted from the first and second optical fibers 74 and 75 are made into parallel beams by collimate lenses 76 and 77, respectively, and each of the parallel beams is then divided into two beans by polarizing beam splitters 78 and 79. The divided beams are individually received by four detectors 80, 81, 82 and 83, thus obtaining a focusing error signal by computing outputs from the detectors 80-83.

However, in the conventional system shown in FIG. 11, the reflected light from the optical disk is separated by the first and second beam splitters 61 and 64, and the separated light beams are used for obtaining the servo signal and the information signal. As a result, it is difficult to make the optical head compact. Furthermore, since the focusing error signal and the tracking signal are detected by the same detector 63, there is a possibility that the tracking signal will leak into the focusing error signal.

In the conventional system shown in FIG. 12, the path of the light reflected from the optical disk is changed path by using the first beam splitter 71, and is then applied to the inlet ends of the optical fibers 74 and 75 by using the second beam splitter 73 which has different sizes in its transmitting direction and reflecting direction. Accordingly, when the position of the second beam splitter 73 slips the quantity of light entering the optical fibers 74 and 75 is greatly changed, resulting in the easy generation of an error in the focusing error signal. Furthermore, adjustment for introducing the reflected light from the optical disk to the inlet ends of the optical fibers 74 and 75 is critical and difficult.

Further, while the optical head shown in FIG. 12 is separated into a fixed portion and a movable portion to make the movable portion compact and light, the movable portion includes two beam splitters, two lenses and three optical fibers inclusive of an optical system from a laser light source 84. Thus, the construction of the movable portion is not sufficiently compact.

SUMMARY OF THE INVENTION

It is an object of the present invention to provide a focusing error detecting system for an optical head which eliminates the defects in the prior systems mentioned above, wherein the optical head is made compact, and the leakage of an information signal and a tracking signal into the focusing error signal can be eliminated.

It is another object of the present invention to provide a focusing error detecting system for an optical head using an optical fiber wherein the optical head can be made compact, and no offset is generated in the focusing error signal even when optical parts slip in their positions.

According to a first aspect of the present invention, there is provided a focusing error detecting method for an optical head wherein a laser beam from a laser light source is applied to a magneto-optical recording medium to form as an image a light spot thereon, and a focusing error is detected according to reflected light from the magneto-optical recording medium, the focusing error detecting method comprising the steps of dividing the reflected light from the magneto-optical recording medium into a 0-th order light, a +1-st order light and a —1-st order light by a diffraction grating; applying the +1-st order light and the —1-st order light to a first detector and a second detector, respectively, the first and second detectors being arranged before and behind a beam emitting position of the laser light source, respectively; and computing outputs from the first and second detectors to obtain a focusing error signal.

In this case, it is preferable that the laser light source is a semiconductor laser, and that the first and second detectors are mounted on a chip of the semiconductor laser to form a hybrid construction, thereby making the optical head more compact.

According to a second aspect of the present invention, there is provided a focusing error detecting method for an optical head wherein a laser beam from a laser light source is applied to a magneto-optical recording medium to form as an image a light spot thereon, and a focusing error is detected according to reflected light from the magneto-optical recording medium, the focusing error detecting method comprising the steps of dividing the laser beam from the laser light source into a 0-th order light, a +1-st order light and a −1-st order light by a diffraction grating; applying the +1-st order light to one end of a first directional coupler and also applying the −1-st order light to one end of a second directional coupler; emitting the +1-st order light from an optical fiber connected to the other end of the first directional coupler and also emitting the −1-st order light from an optical fiber connected to the other end of the second directional coupler, the optical fibers having respective outlet ends disposed at positions shifted away from and toward a focus lens located before the magneto-optical recording medium for forming the light spot; applying the +1-st order light and the −1-st order light reflected on the magneto-optical recording medium through the first directional coupler and the second directional coupler to a first detector and a second detector, respectively; and computing outputs from the first and second detectors to obtain a focusing error signal.

In the first aspect, the first and second detectors are arranged before and behind the beam emitting position of the laser light source, respectively. Therefore, when the magneto-optical recording medium is displaced in one direction to cause a focusing error, a diameter of the beam of the +1-st order light to be received by the first detector is increased or decreased, while a diameter of the beam of the −1-st order light to be received by the second detector is decreased or increased correspondingly. That is, a change in the diameter of each beam is reversed between the first and second detectors. Further, the degree of such a change is varied with a degree of the focusing error. Accordingly, a focusing error signal can be obtained by computing the outputs from both the detectors. Thus, the focusing error is detected according to the reflected light from the magneto-optical recording medium without changing the light path of the reflected light, and the number of beam splitters can be reduced to thereby make the optical head compact. Further, as the detection of the focusing error signal is carried out independently of the detection of the information signal and tracking signal, there is no possibility that the information signal and tracking signal are leaked into the focusing error signal. Moverover, as the focusing error signal is obtained without separating the reflected light from the magneto-optical recording medium by using a beam splitter or the like, the optical head can be made compact.

In the second aspect, the respective outlet ends of the optical fibers connected to the output ends of the first and second directional couplers are disposed at positions shifted away from and toward the focus lens. Therefore, when the magneto-optical recording medium is displaced in one direction to cause a focusing error, the quantity of light received by one of the first and second detectors is increased, and the quantity of light received by the other is decreased. Accordingly, a focusing error signal is obtained by computing the outputs from both the detectors. Further, even when the outlet ends of the optical fibers are slipped in position, no offset of the signal is generated because the reflected light from the magneto-optical recording medium is returned to the original outlet ends of the optical fibers. Further, as the reflected light from the magneto-optical recording medium is introduced through the directional couplers (optical fiber couplers) to the dectectors, the optical head can be made compact.

An information signal and a tracking signal can be obtained by applying the 0-th order light reflected on the magneto-optical recording medium to a third detector and taking an output from the third detector.

The above and other objects, advantages and features of the invention will become more apparent from the following detailed description and appended claims when taken with the accompanying drawings.

BRIEF DESCRIPTION OF THE DRAWINGS

FIGS. 2A to 2C are elevational views of the first and second detectors shown in FIG. 1, showing the shape thereof and a change in diameter of the laser beam received by the detectors due to a focusing error;

FIG. 3 is a graph of a focusing error signal obtained according to outputs from the detectors;

DETAILED DESCRIPTION OF THE PREFERRED EMBODIMENTS

There will now be described some preferred embodiments of the present invention with reference to the drawings.

FIRST PREFERRED EMBODIMENT

A first preferred embodiment will be described with reference to FIGS. 1 to 5A-5D.

Figure 1:
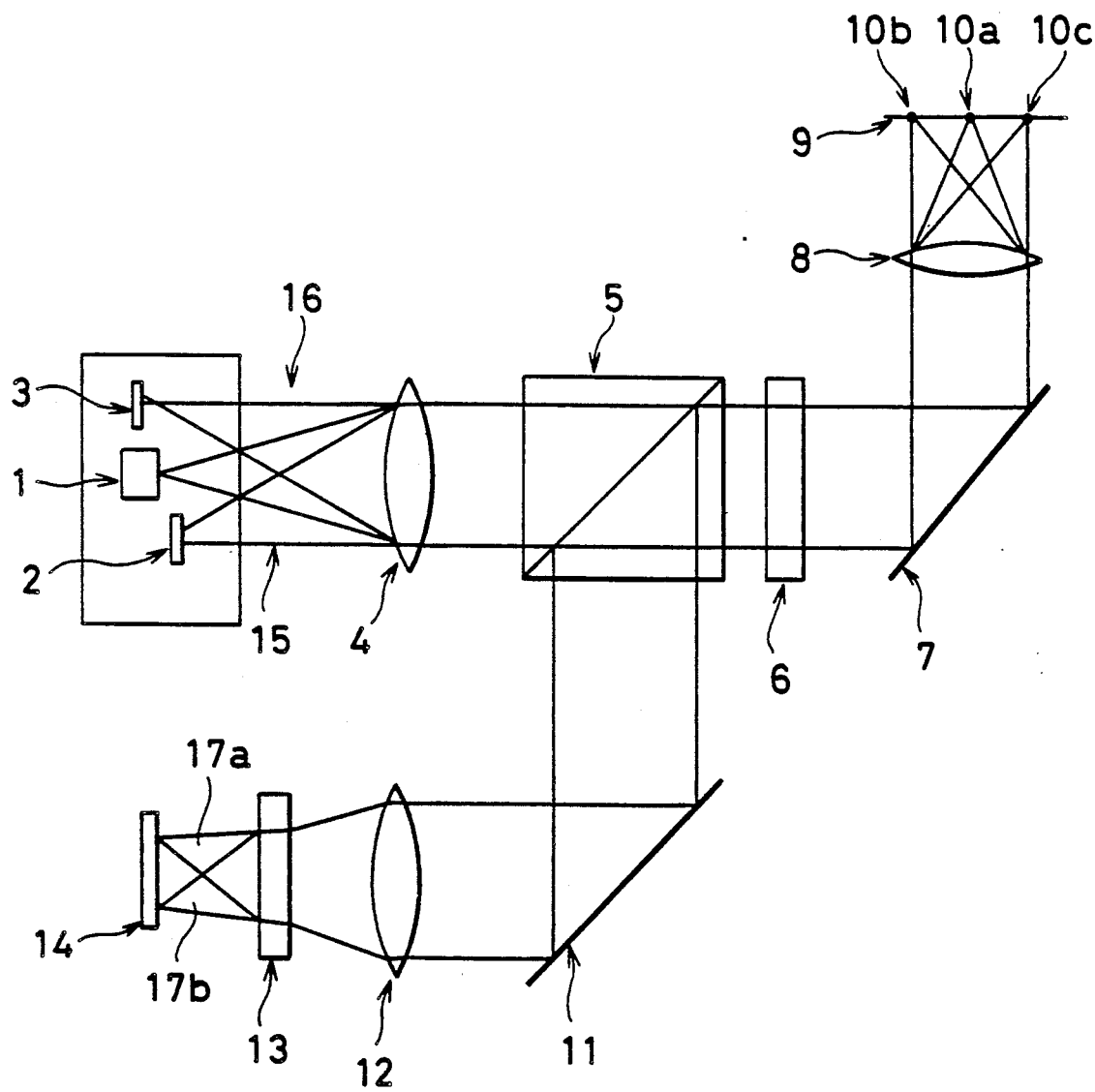
FIG. 1 is a schematic illustration of the construction of the optical system according to a first preferred embodiment of the present invention.

FIG. 1 shows the construction of an optical system of a magneto-optical head for detecting a focusing error according to the method of the present invention. Referring to FIG. 1, the optical system includes a semiconductor laser 1 for emitting a laser beam, optical image formation means (4, 7, 8) for image formation as light spots of the laser beam on an optical disk 9, and a detector 14 for receiving a reflected light from the optical disk 9 through optical image formation means (5, 11, 12). Further, the optical system includes a diffraction grating 6 for dividing the reflected light from the optical disk 9 into a 0-th order light, a +1-st order light and a −1-st order light. A plurality of detectors 2 and 3 are located at positions shifted frontward and rearward from a beam emitting position of the semiconductor laser 1. The detectors 2 and 3 receive the +1-st order light and the −1-st order light, respectively. Outputs from the detectors 2 and 3 are computed to obtain a focusing error signal.

More specifically, the laser beam emitted from the semiconductor laser 1 is made into a parallel beam by using a collimate lens 4. The parallel beam is transmitted through a beam splitter 5, and is diffracted by the diffraction grating 6. Then, the light path is changed by a galvanomirror 7, and the diffracted beams are focused by a focus lens 8 to form three light spots 10a, 10b and 10c on the optical disk 9. The light spots 10a, 10b and 10c correspond to the 0-th order light, the +1-st order light and the −1-st order light obtained by the diffraction grating 6.

The diffracted beams are reflected on the optical disk 9, and are returned to follow the original light path. Then, they are diffracted again by the diffraction grating 6, and are divided into transmitted light and reflected light by the beam splitter 5.

In the transmitted light, the 0-th order light (10a) is divided by the diffraction grating 6 into a +1-st order light 15 to be received by the detector 2, a −1-st order light 16 to be received by the detector 3 and a 0-th order light to be returned to the semiconductor laser 1.

As shown in FIGS. 2A to 2C, each of the detectors 2 and 3 is constructed of two separate segments. The detectors 2 and 3 are arranged on opposite sides of the semiconductor laser 1 at positions shifted frontward and rearward by the same distance from the beam emitting position of the semiconductor laser 1. That is, the first detector 2 is located at a position before a focal point of the collimate lens 4, while the second detector 3 is located at a position behind the focal point of the collimate lens 4. The positions of the first and second detectors 2 and 3 are shifted by the same distance from the focal point of the collimate lens 4. Accordingly, when the optical disk 9 is not slipped but is positioned on the focal plane as shown in FIG. 1, diameter of the beam received by the first detector 2 is equal to that received by the second detector 3 as shown in FIG. 2B.

When the optical disk 9 is slipped toward the focus lens 8, the diameter of the beam to be received by the first detector 2 becomes large as shown in FIG. 2A, while the diameter of the beam to be received by the second detector 3 becomes small as shown in FIG. 2C.

Conversely, when the optical disk 9 is slipped away from the focus lens 8, a change in the diameter of the beam is reversed to that in the above case. That is, the diameter of the beam to be received by the first detector 2 becomes small as shown in FIG. 2C, while the diameter of the beam to be received by the second detector 3 becomes large as shown in FIG. 2A.

Accordingly, a focusing error signal as shown in FIG. 3 can be obtained by subtracting a quantity of light received by the second detector 3 from a quantity of light received by the front detector 2.

As to the detection of an information signal, the reflected light from the optical disk 9 is reflected by the beam splitter 5, and the light path is changed by a corner mirror 11. Then, the reflected light is converged by a convex lens 12, and is then separated by a Wollaston prism 13 into an S-polarization component 17a and a P-polarization component 17b. These components 17a and 17b are received by the detector 14. In modification, the corner mirror 11 may be eliminated so as to detect the information signal without changing the light path.

Figure 4:
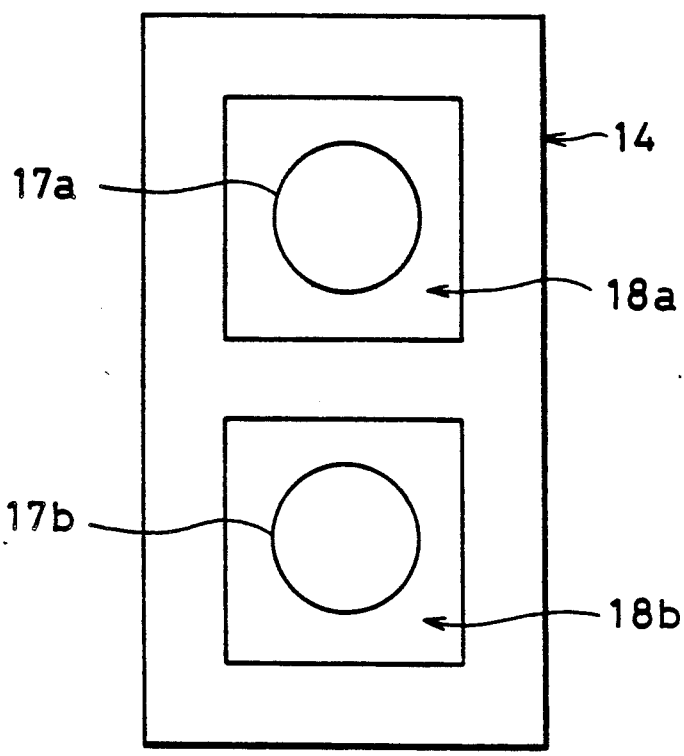
FIG. 4 is an elevation of a third detector for detecting an information signal and a tracking signal.

As shown in FIG. 4, the detector 14 includes a light receiving portion 18a for receiving the S-polarization component 17a and a light receiving portion 18b for receiving the P-polarization component 17b. These light receiving portions 18a and 18b are separated from each other. The information signal can be obtained by subtracting an output signal of the light receiving portion 18a from an output signal of the light receiving portion 18b.

Tracking control is carried out by using a known sample servo system.

Figure 5A:
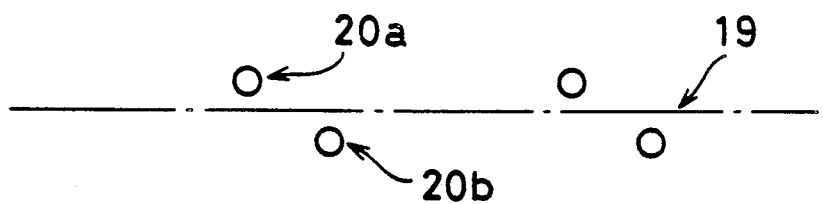
FIGS. 5A to 5D are illustrations explaining a sample servo system for detection of the tracking signal.
Figure 5B:
Figure 5C:
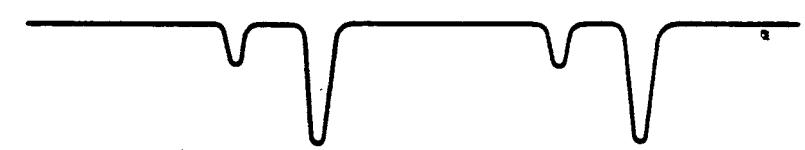
Figure 5D:
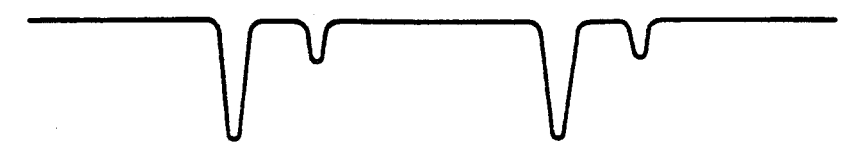

As shown in FIG. 5A, a pair of pits 20a and 20b are provided at opposite positions with respect to a track 19 at a small distance therebetween along the track 19. When the light spot 10a scans on the track 19, the quantity of light received by the detector 14 is reduced at the pits 20a and 20b to the same degree as shown in FIG. 5B. When the light spot 10a is slipped downwardly from the track 19 as viewed in FIG. 5A, the reduction in the quantity of light received by the detector 14 at the pit 20a becomes small, while the reduction in the quantity of light received by the detector 14 at the pit 20b becomes large as shown in FIG. 5C. Conversely, when the light spot 10a is slipped upwardly from the track 19 as viewed in FIG. 5A, the reduction in the quantity of light at the pit 20a becomes large, while the reduction in the quantity of light at the pit 20b becomes small as shown in FIG. 5D.

Accordingly, the light receiving level modulated at the pits 20a and 20b can be acknowledged by monitoring the sum of the light quantities received by the light receiving portions 18a and 18b of the detector 14, thus obtaining a tracking error signal. Then, a tracking actuator is operated by using this tracking error signal to thereby achieve the tracking control.

According to the first preferred embodiment, the detection of the focusing error signal is carried out without changing the light path, and the number of the beam splitters can be accordingly reduced to thereby make the optical head compact. Further, as the detection of the focusing error is carried out independently of the detection of the information signal and tracking signal, there is no possibility that the information signal and tracking signal will leak into the focusing error signal. Further, as the information signal and the tracking signal are detected on a single light receiving surface by using a single light spot, adjustment of the detector can be greatly reduced, thereby making the adjustment easy.

Although the detectors 2 and 3 are located independently of the semiconductor laser 1 in the first preferred embodiment, the detectors 2 and 3 may be mounted on a chip of the semiconductor laser 1 to form a hybrid construction, thus making the optical head more compact.

SECOND PREFERRED EMBODIMENT

A second preferred embodiment using an optical fiber will now be described with reference to FIGS. 6 to 10, in which the same or corresponding parts as in the first preferred embodiment are designated by the same reference numerals.

Figure 6:
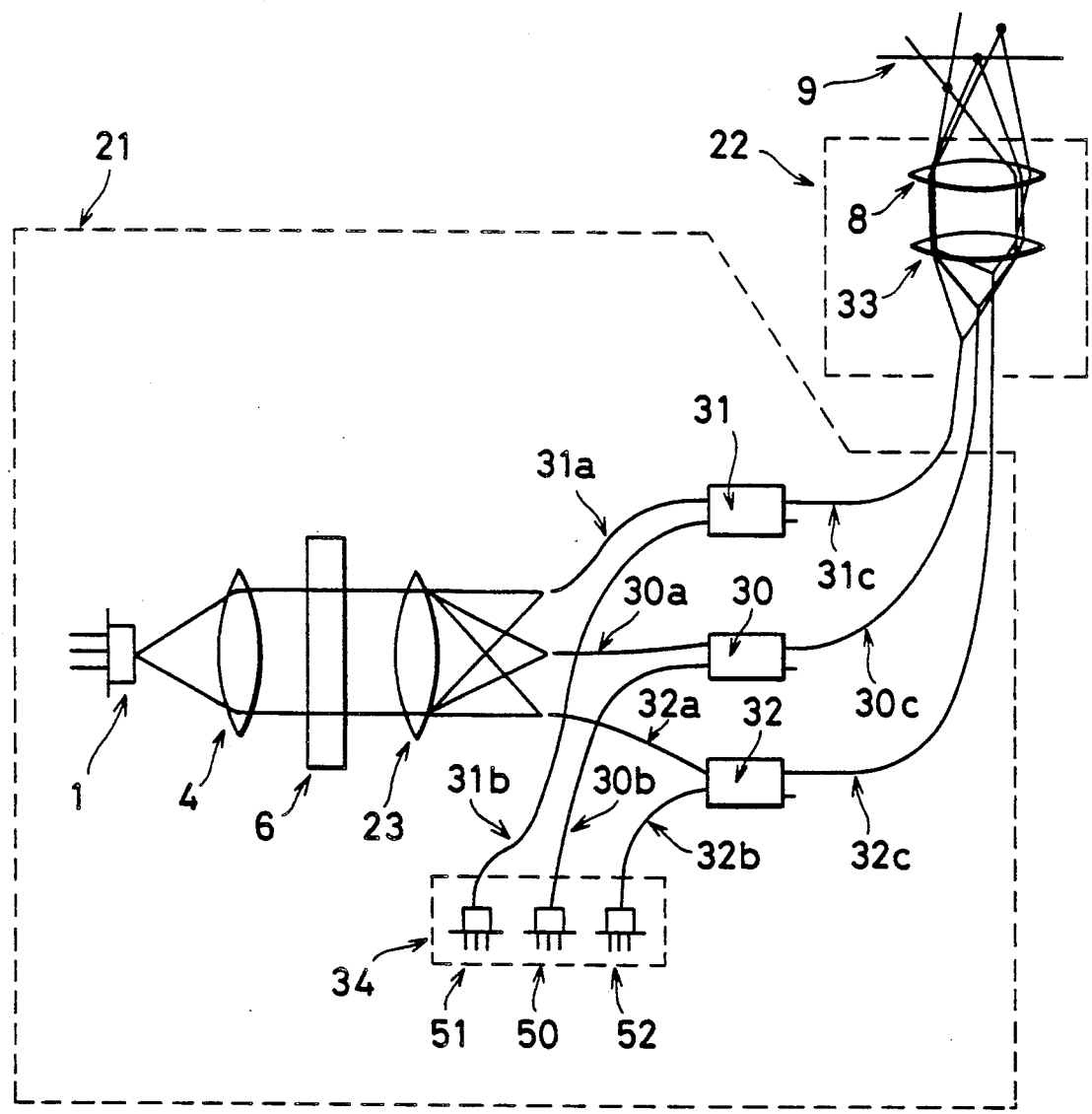
FIG. 6 is a schematic illustration of the optical system according to a second preferred embodiment of the present invention.
Figure 7:
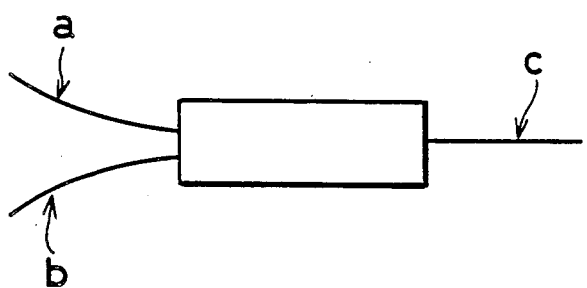
FIG. 7 is a schematic illustration of a basic construction of a directional coupler.

FIG. 6 shows a construction of an optical system for detecting a focusing error according to the method of the present invention, and FIG. 7 shows a basic construction of a directional coupler (optical fiber coupler) shown in FIG. 6. Referring to FIG. 7, the directional coupler has a characteristic such that when light enters an inlet end a, the light is allowed to emit from an outlet end c only, while when light enters the outlet end c, the light is allowed to emit from the inlet end a and another inlet end b. The directional coupler to be used may be of various known types such as an abrasive type and a fusion type.

Referring to FIG. 6, the optical head is separated into a fixed portion 21 and a movable portion 22. A laser beam emitted from a semiconductor laser 1 is made into a parallel beam by using a collimate lens 4. Then, the parallel beam is divided into a plurality of beams by using a diffraction grating 6. Then, the beams are converged by a converging lens 23 to enter optical fibers 30a, 31a and 32a connected to first input ends of directional couplers 30, 31 and 32, respectively. In this case, the beams diffracted by the diffraction grating 6 correspond to an 0-th order light adapted to enter the optical fiber 30a, a +1-st order light adapted to enter the optical fiber 31a and a −1-st order light adapted to enter the optical fiber 32a.

(a) 0-th order light

The 0-th order light component of the laser beam having entered the optical fiber 30a is emitted from an optical fiber 30c connected to the output end of the directional coupler 30. According to the characteristic of the directional coupler 30, the 0-th order light having entered the optical fiber 30a does not quite advance to the optical fiber 30b connected to a second input end of the directional coupler 30.

Figure 8:
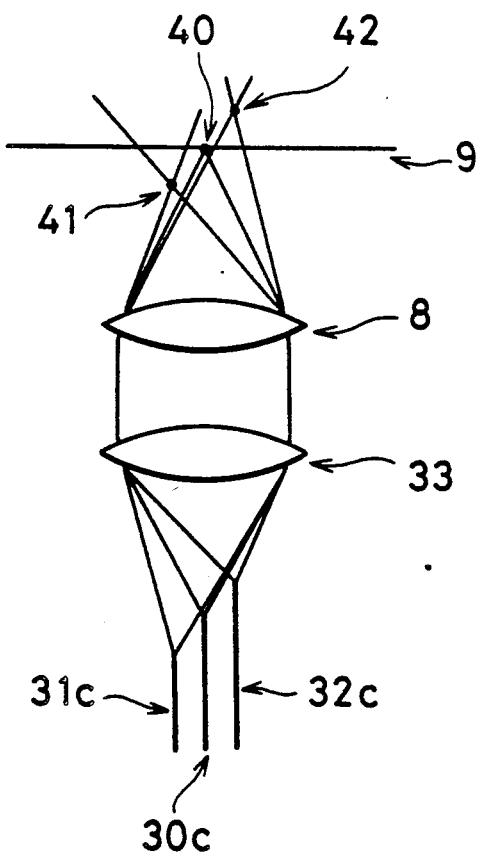
FIG. 8 is an enlarged view showing an image formation condition of light spots on an optical disk.

The 0-th order light emitted from the optical fiber 30c is made into a parallel beam by a collimate lens 33, and is then focused by a focus lens 8 to form an image as a light spot on an optical disk 9 at a focal point 40 (see FIG. 8). Then, the light is reflected on the optical disk 9, and is returned through the original light path to the optical fiber 30c. Then, the light is allowed to advance to the optical fibers 30a and 30b by the directional coupler 30. The light emitted from the optical fiber 30b is received by a detector 50 for providing an information signal and a tracking signal.

In the case where the optical disk 9 is of a phase changing type, the strength of the reflected light from the optical disk 9 is changed according to recorded information. Accordingly, the information signal can be obtained by detecting a change in the strength of the reflected light by the detector 50. On the other hand, tracking information can be obtained by using a known sample servo system. That is, as the strength of the reflected light is changed according to the slippage of the light spot on the optical disk 9, the tracking signal can be obtained by detecting a change in the strength of the reflected light by the detector 50.

(b) +1-st order light and −1-st order light

A focusing error is detected by the following method on the basis of the +1-st order light and the −1-st order light.

The +1-st order light converged by the converging lens 23 is allowed to enter the optical fiber 31a of the directional coupler 31. Similarly, the −1-st order light converged by the converging lens 23 is allowed to enter the optical fiber 32a of the directional coupler 32.

According to the characteristics of the directional coupler 31, the laser beam having entered the optical fiber 31a does not quite advance to an optical fiber 31b connected to a second input end of the directional coupler 31. Similarly, according to the characteristics of the directional coupler 32, the laser beam having entered the optical fiber 32a does not quite advance to an optical fiber 32b connected to a second input end of the directional coupler 32. However, strictly speaking, a small quantity of each laser beam does enter the optical fibers 30a, 31a and 32a and advances to the optical fibers 30b, 31b and 32b, respectively. However, this quantity can be dealt with and corrected at the time of computing outputs from detectors 51 and 52 for obtaining a focusing signal later.

FIG. 8 shows an image forming condition of the light spots on the optical disk 9. Referring to FIG. 8, the laser beam (+1-st order light) having entered the optical fiber 31a of the directional coupler 31 is emitted from the optical fiber 31c. An outlet end of the optical fiber 31c is set at a position before an outlet end of the optical fiber 30c. Therefore, the laser beam emitted from the optical fiber 31c is focused at a point 41 before the optical disk 9.

On the other end, the laser beam (−1-st order light) having entered the optical fiber 32a of the directional coupler 32 is emitted from the optical fiber 32c. An outlet end of the optical fiber 32c is set at a position behind the outlet end of the optical fiber 30c. In other words, the outlet end of the optical fiber 32c is located at a position near the collimate lens 33. Therefore, the laser beam emitted from the optical fiber 32c is focused at a point 42 behind the optical disk 9 (i.e., at a position far from the focus lens 8.)

The laser beams are reflected on the optical disk 9, and are then returned to the outlet ends of the optical fibers 31c and 32c. Then, the laser beams are allowed to advance to the optical fibers 31a and 31b and the optical fibers 32a and 32b according to the characteristics of the directional couplers 31 and 32. The laser beams emitted from the optical fibers 31b and 32b are received by the detectors 51 and 52, respectively.

Figure 9:
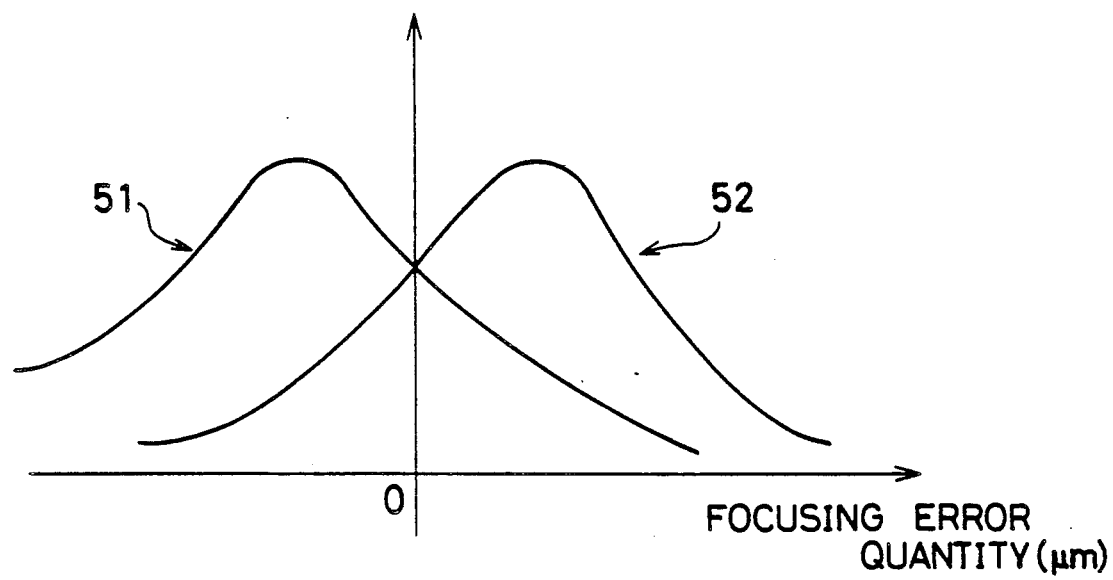
FIG. 9 is a characteristic graph showing the relationship between a focusing error quantity and a light quantity of light to be received by the detectors.

FIG. 9 shows a change in the quantities of light received by the detectors 51 and 52 due to a focusing error.

Figure 10:
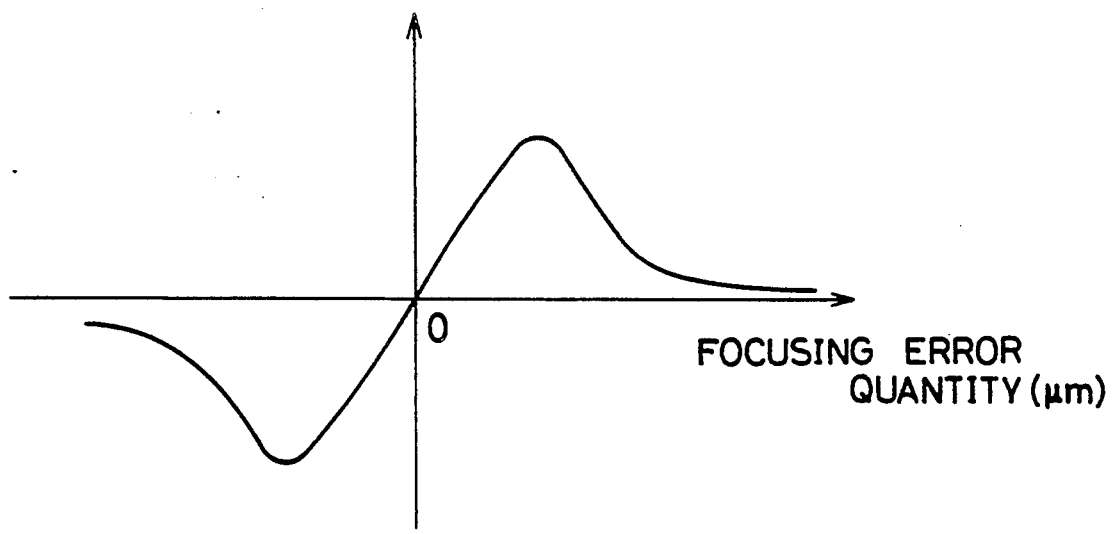
FIG. 10 is a graph of a focusing error signal obtained according to outputs from the detectors.
Figure 11:
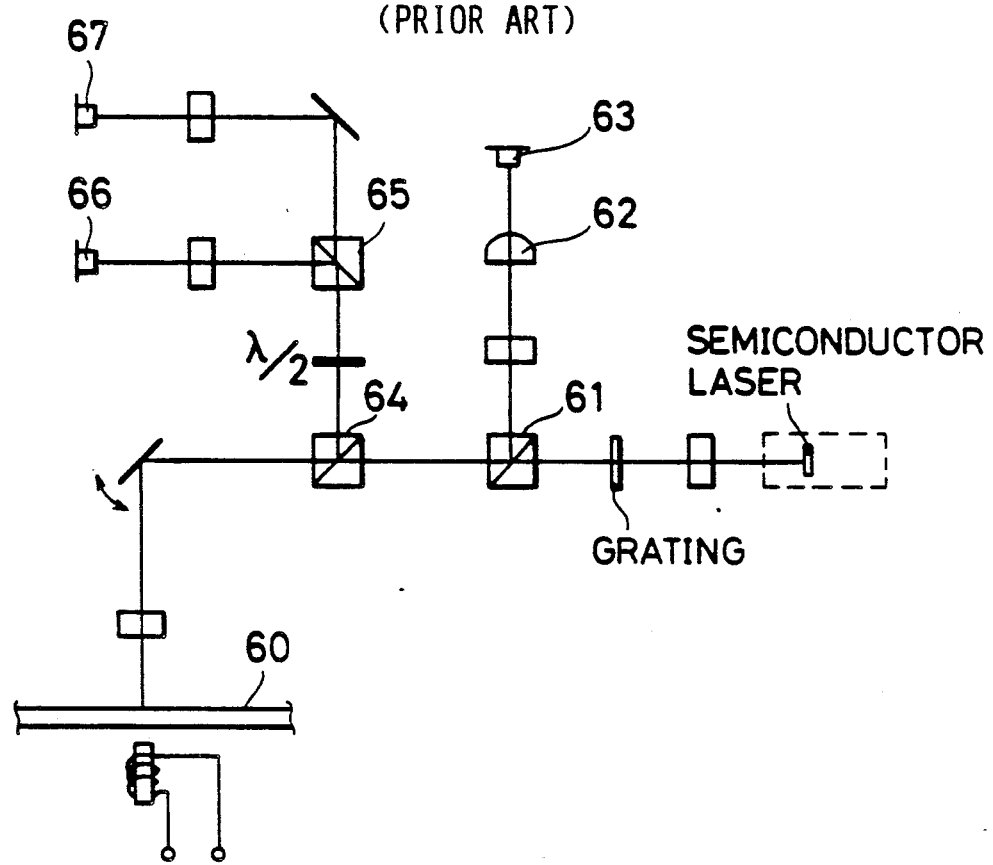
FIG. 11 is a schematic illustration of the construction of an example of the prior art optical head.
Figure 12:
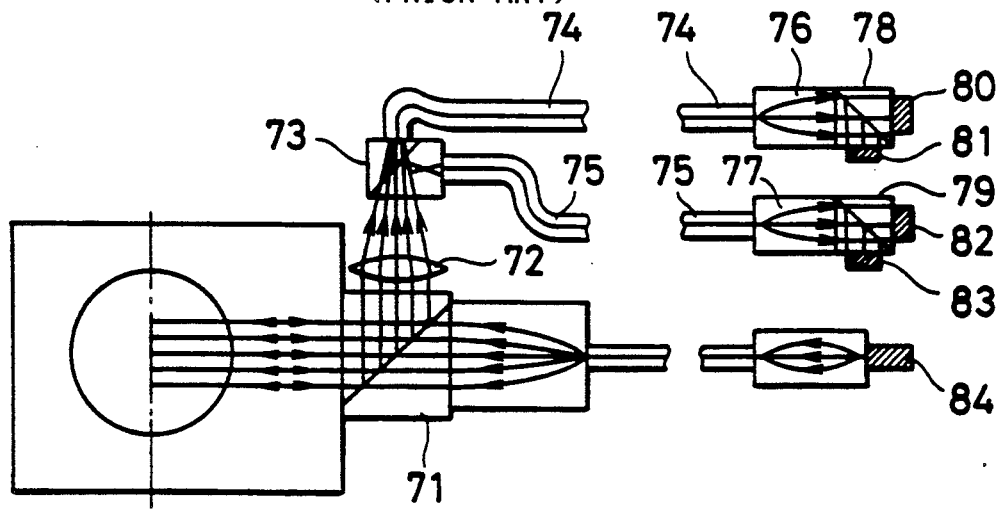
FIG. 12 is a schematic illustration of the construction of another example of the prior art optical head.

When the optical disk 9 is slipped upwardly as viewed in FIG. 8, it comes near the focal point 42 of the laser beam emitted from the optical fiber 32c, resulting in an increase in the light quantity received by the detector 52. On the other hand, the optical fiber 9 comes away from the focal point 41 of the laser beam emitted from the optical fiber 31c, resulting in a decrease in the light quantity received by the detector 51. Conversely, when the optical disk 9 is slipped downwardly as viewed in FIG. 8, the operation is reversed to the above. As a result, the characteristic between the focusing error quantity and the light quantity received by the detectors as shown in FIG. 9 is obtained. Accordingly, a focusing error signal as shown in FIG. 10 can be obtained by subtracting the output of the detector 52 from the output of the detector 51, for example.

According to the second preferred embodiment, the information signal, the focusing error signal and the tracking signal are detected with the use of the directional couplers (optical fiber couplers). As the optical head is separated into the movable portion and the fixed portion, the optical system of the movable portion can be made compact and light. Further, even if the outlet ends of the optical fibers are slipped, the reflected light from the optical disk is returned to the outlet ends of the optical fibers. Accordingly, offset of the signals is hardly generated even if the optical parts slip. Moreover, as the focusing error signal, the tracking signal and the information signal are obtained from a total light quantity, adjustment of the detectors is almost not necessary, and adjustment of the optical head can be therefore greatly simplified. Further, mutual leakage among these signals can be prevented.

The amount of slippage of the outlet end of the optical fiber 31c from the outlet end of the optical fiber 30c is equal to the amount of slippage of the outlet end of the optical fiber 32c from the outlet end of the optical fiber 30c in the above preferred embodiment. However, the position of the outlet end of the optical fiber 31c may be behind the position of the outlet end of the optical fiber 30c, and the position of the outlet end of the optical fiber 32c may be set before the position of the outlet end of the optical fiber 30c. Further, whether or not the optical head is separated into the movable portion and the fixed portion is optional.

Additionally, as shown by a dashed line in FIG. 6, the detectors 50, 51 and 52 are preferably mounted in a single package 34 to make the optical head more compact.

What is claimed is:

1. A focusing error detecting method for an optical head wherein a laser beam from a laser light source is applied to a magneto-optical recording medium to form an image as a light spot thereon, and a focusing error is detected according to a reflected light from said magneto-optical recording medium, said focusing error detecting method comprising the steps of:

dividing said laser beam from said laser light source into a 0-th order light, a +1-st order light and a −1-st order light by a diffraction grating;

applying said +1-st order light to one end of a first directional coupler and also applying said −1-st order light to one end of a second directional coupler;

emitting said +1-st order light from an optical fiber connected to the other end of said first directional coupler and also emitting said −1-st order light from an optical fiber connected to the other end of said second directional coupler, said optical fibers having respective outlet ends disposed at positions shifted away from and toward a focus lens located before said magneto-optical recording medium for forming said light spot;

applying said +1-st order light and said −1-st order light reflected on said magneto-optical recording medium through said first directional coupler and said second directional coupler to a first detector and a second detector, respectively; and computing outputs from said first and second detectors to obtain a focusing error signal.

2. The focusing error detecting method as defined in claim 1, wherein said outlet ends of said optical fibers of said first and second directional couplers are disposed at the positions shifted by the same distance away from and toward said focus lens in such a manner that said +1-st order light is focused at a point before said magneto-optical recording medium and said −1-st order light is focused at a point behind said magneto-optical recording medium.

3. The focusing error detecting method as defined in claim 1 further comprising the steps of:

applying said 0-th order light from said diffraction grating to one end of a third directional coupler;

emitting said 0-the order light from an optical fiber connected to the other end of said third directional coupler, said optical fiber having an outlet end disposed at a position before said focus lens in such manner that said 0-th order light is focused at a point on said magneto-optical recording medium;

applying said 0-th order light reflected on said magneto-optical recording medium through said third directional coupler to a third detector; and obtaining an information signal and a tracking signal according to an output from said third detector.

4. An optical head wherein a laser beam from a laser light source is applied to a magneto-optical recording medium to form an image as a light spot thereon, and a focusing error is detected according to light reflected from said magneto-optical recording medium, said optical head comprising:

a diffraction grating for dividing said laser beam from said laser light source into a 0-the order light, a +1-st order light and a −1-st order light;

a first directional coupler having a first input end connected to an optical fiber for receiving said +1-st order light from said diffraction grating;

a second directional coupler having a first input end connected to an optical fiber for receiving said −1-st order light from said diffraction grating;

first and second optical fibers connected to output ends of said first and second directional couplers, respectively, for leading said +1-st order light and said −1-st order light, said first and second optical fibers having respective outlet ends disposed at positions shifted away from and toward a focus lens located before said magneto-optical recording medium, respectively, in such a manner that said +1-st order light is focused at a point before said magneto-optical recording medium and said −1-st order light is focused at a point behind said magneto-optical recording medium;

first and second detectors connected through optical fibers to second input ends of said first and second directional couplers, respectively, for receiving said +1-st order light and said −1-st order light reflected on said magneto-optical recording medium and returned through said optical fibers to said first and second directional couplers, respectively, wherein outputs from said first and second detectors are computed to obtain a focusing error signal.

5. The optical head as defined in claim 4, wherein said outlet ends of said first and second optical fibers are disposed at positions shifted by the same distance away from and toward said focus lens, respectively.

6. The optical head as defined in claim 4 further comprising:

a third directional coupler having a first input end connected to an optical fiber for receiving said 0-th order light from said diffraction grating;

a third optical fiber connected to an output end of said third directional couper for leading said 0-th order light, said third optical fiber having an outlet end disposed at a position before said focus lens in such a manner that said 0-th order light is focused at a point on said magneto-optical recording medium;

a third detector connected through an optical fiber to a second input end of said third directional coupler for receiving said 0-th order light reflected on said magneto-optical recording medium and returned through said optical fiber to said third directionl coupler, wherein an information signal and a tracking signal are obtained according to an output from said third detector.

7. The optical head as defined in claim 6, wherein said optical head is separated into a movable portion including said focus lens and a fixed portion including said first, second and third directional couplers, and said optical fibers are interposed between said movable portion and said fixed portion.

* * * * *

UNITED STATES PATENT AND TRADEMARK OFFICE
CERTIFICATE OF CORRECTION

PATENT NO. : 5,095,472

DATED : March 10, 1992

INVENTOR(S) : Akihiro Uchino; Seigo Naitoh; Hirobumi Ouchi; and Shigeru Nakamura It is certified that error appears in the above-identified patent and that said Letters Patent is hereby corrected as shown below:

ON THE TITLE PAGE:

In the Abstract, line 5, change "detecting" to --detected--.

In the Abstract, line 17, change "preferably" to --preferable--.

Signed and Sealed this

Twenty-first Day of September, 1993

*Attest:*

BRUCE LEHMAN

*Attesting Officer*     *Commissioner of Patents and Trademarks*